United States Patent
Taki

(10) Patent No.: US 8,150,593 B2
(45) Date of Patent: Apr. 3, 2012

(54) VEHICLE CONTROL APPARATUS, AND VEHICLE CONTROL METHOD

(75) Inventor: Naoki Taki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 397 days.

(21) Appl. No.: 12/310,819

(22) PCT Filed: Dec. 7, 2007

(86) PCT No.: PCT/IB2007/004239
§ 371 (c)(1),
(2), (4) Date: Mar. 9, 2009

(87) PCT Pub. No.: WO2008/068620
PCT Pub. Date: Jun. 12, 2008

(65) Prior Publication Data
US 2009/0234526 A1  Sep. 17, 2009

(30) Foreign Application Priority Data

Dec. 8, 2006  (JP) ................................ 2006-332343

(51) Int. Cl.
*B60T 7/12* (2006.01)
(52) U.S. Cl. ........... 701/96; 701/301; 340/435; 340/436
(58) Field of Classification Search .................... 701/93, 701/96, 70, 300–302; 340/425.5, 435–436
See application file for complete search history.

(56) References Cited

U.S. PATENT DOCUMENTS

| 6,006,144 | A | 12/1999 | Takahashi et al. |
| 6,226,593 | B1 | 5/2001 | Kurz et al. |
| 2005/0085984 | A1 | 4/2005 | Uhler et al. |
| 2006/0122752 | A1* | 6/2006 | Ishio et al. ..................... 701/48 |
| 2006/0208169 | A1* | 9/2006 | Breed et al. ................... 250/221 |
| 2011/0133957 | A1* | 6/2011 | Harbach et al. ............ 340/932.2 |

FOREIGN PATENT DOCUMENTS

| DE | 101 60 939 A1 | 6/2003 |
| DE | 103 47 980 A1 | 3/2005 |
| EP | 1 018 458 A2 | 7/2000 |
| EP | 1 516 767 A2 | 3/2005 |
| FR | 2 855 481 A1 | 12/2004 |
| JP | A-2002-59820 | 2/2002 |
| JP | A-2002-266735 | 9/2002 |
| JP | A-2004-17865 | 1/2004 |

(Continued)

OTHER PUBLICATIONS

Office Action in Chinese Patent Application No. 200780042115.5 mailed on Sep. 16, 2010. (with English-language Translation).

(Continued)

*Primary Examiner* — Yonel Beaulieu
(74) *Attorney, Agent, or Firm* — Oliff & Berridge, PLC

(57) ABSTRACT

A vehicle control apparatus (1) provided with an automatic cruise apparatus (30) that automatically moves a vehicle, and a pre-crash brake apparatus (40) that automatically applies a brake to the vehicle when an obstacle is detected, includes cruising output value setting means (15) for making a cruising output value, which should be achieved using the automatic cruise apparatus (1), smaller than a regular cruising output value used in normal times, when the obstacle is detected.

11 Claims, 4 Drawing Sheets

FOREIGN PATENT DOCUMENTS

| | | |
|---|---|---|
| JP | A-2004-50925 | 2/2004 |
| JP | A-2004-110394 | 4/2004 |
| JP | A-2004-203359 | 7/2004 |
| JP | A-2004-351992 | 12/2004 |
| JP | A-2006-96191 | 4/2006 |
| JP | A-2006-273122 | 10/2006 |

OTHER PUBLICATIONS

Office Action issued in Japanese Patent Application No. 2006-332343 by the Japanese Patent Office on Dec. 8, 2009. (with English Translation).

* cited by examiner

VEHICLE CONTROL APPARATUS, AND VEHICLE CONTROL METHOD

BACKGROUND OF THE INVENTION

1. Field of the Invention

The invention relates to a vehicle control apparatus and a vehicle control method for controlling a vehicle provided with a pre-crash brake apparatus and an automatic cruise apparatus.

2. Description of the Related Art

An apparatus that automatically applies a brake to a vehicle is described in, for example, Japanese Patent Application Publication No. 2004-351992 (JP-A-2004-351992). When a sensor detects an obstacle during the operation for backing up the vehicle, this apparatus automatically applies a brake to the vehicle with a braking force which corresponds to the vehicle speed and the distance between the vehicle and the obstacle.

However, if the above-mentioned technology is applied to a vehicle provided with an intelligent parking assist apparatus that automatically parks the vehicle, there is a possibility that an appropriate braking operation is not performed for the following reason. Even if an obstacle is detected behind the vehicle and a braking force is automatically applied to the vehicle, the intelligent parking assist apparatus is activated independently of the automatic braking operation.

SUMMARY OF THE INVENTION

The invention is made in the light of the above-mentioned circumstances. The invention provides a vehicle control apparatus and a vehicle control method that make it possible to appropriately control a vehicle provided with an automatic cruise apparatus and a pre-crash brake apparatus by ensuring appropriate coordination between the automatic cruise apparatus and the pre-crash brake apparatus.

A first aspect of the invention relates to a vehicle control apparatus provided with an automatic cruise apparatus that automatically moves a vehicle, and a pre-crash brake apparatus that automatically applies a brake to the vehicle when an obstacle is detected. The vehicle control apparatus includes cruising output value setting means for making a cruising output value, which should be achieved using the automatic cruise apparatus, smaller than a regular cruising output value used in a normal time, when the obstacle is detected.

In the vehicle control apparatus, the cruising output value, which should be achieved using the automatic cruise apparatus, is made smaller than the regular cruising output value, when the obstacle is detected. Accordingly, a brake is more easily applied to the vehicle by the pre-crash brake apparatus. In this way, the safety of the vehicle is maintained without reducing the usability, and appropriate coordination is ensured between the automatic cruise apparatus and the pre-crash brake apparatus. As a result, it is possible to control the vehicle appropriately.

In the vehicle control apparatus according to the first aspect of the invention, the automatic cruise apparatus may be an intelligent parking assist apparatus that automatically parks the vehicle. Accordingly, appropriate coordination between the intelligent parking assist apparatus and the pre-crash brake apparatus is ensured. As a result, it is possible to perform the intelligent parking assist operation appropriately.

In the vehicle control apparatus according to the first aspect of the invention, only the pre-crash brake apparatus may be operated, when the intelligent parking assist apparatus is not operated.

In the vehicle control apparatus according to the first aspect of the invention, the cruising output value setting means may set the cruising output value to zero, when the distance between the vehicle and the obstacle is equal to or shorter than a threshold value. Alternatively, the cruising output value setting means may set the cruising output value to zero, when the estimated time to collision between the vehicle and the obstacle is equal to or shorter than a threshold value. Accordingly, a collision between the vehicle and the obstacle is prevented. As a result, it is possible to enhance the safety of the vehicle.

In the vehicle control apparatus according to the first aspect of the invention, the cruising output value setting means may change the manner, in which the cruising output value is made smaller than the regular cruising output value, based on the type of the detected obstacle.

In the vehicle control apparatus according to the first aspect of the invention, the cruising output value setting means may make the cruising output value smaller than the regular cruising output value by a larger amount when an obstacle that may move is detected than when an immovable obstacle is detected. The cruising output value setting means may increase the amount by which the cruising output value is made smaller than the regular cruising output value as the possibility of collision between the vehicle and the obstacle that may move is higher.

In the vehicle control apparatus according to the first aspect of the invention, the automatic cruise apparatus may include drive power increase means for temporarily increasing drive power when the vehicle does not move for a predetermined time although a predetermined cruising output value is provided. The cruising output value setting means may prohibit an increase in the drive power made by the drive power increase means, when the obstacle is detected. A temporary increase in the drive power is prohibited. Accordingly, it is possible to enhance the safety of the vehicle, and to control the vehicle more appropriately.

A second aspect of the invention relates a vehicle control method. According to the vehicle control method, an automatic vehicle cruise is controlled, and whether there is an obstacle within a predetermined area near a vehicle is determined. When an obstacle is detected within the predetermined area during the automatic vehicle cruise, a cruising output value used during an automatic vehicle cruise is made smaller than a regular cruising output value used in a normal time.

In the vehicle control method according to the second aspect of the invention, the cruising output value may be set to zero when the distance between the vehicle and the obstacle or the estimated time to collision between the vehicle and the obstacle is equal to or shorter than a threshold value. The manner, in which the cruising output value is made smaller than the regular cruising output value, may be changed based on the type of the obstacle, when the distance between the vehicle and the obstacle or the estimated time to collision between the vehicle and the obstacle is longer than the threshold value.

In the vehicle control method according to the second aspect of the invention, the automatic vehicle cruise may be an intelligent vehicle parking assist.

The vehicle control apparatus and the vehicle control method according to the above-described aspects of the invention make it possible to appropriately control the vehicle provided with the automatic cruise apparatus and the pre-crash brake apparatus by ensuring appropriate coordination between the automatic cruise apparatus and the pre-crash brake apparatus.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
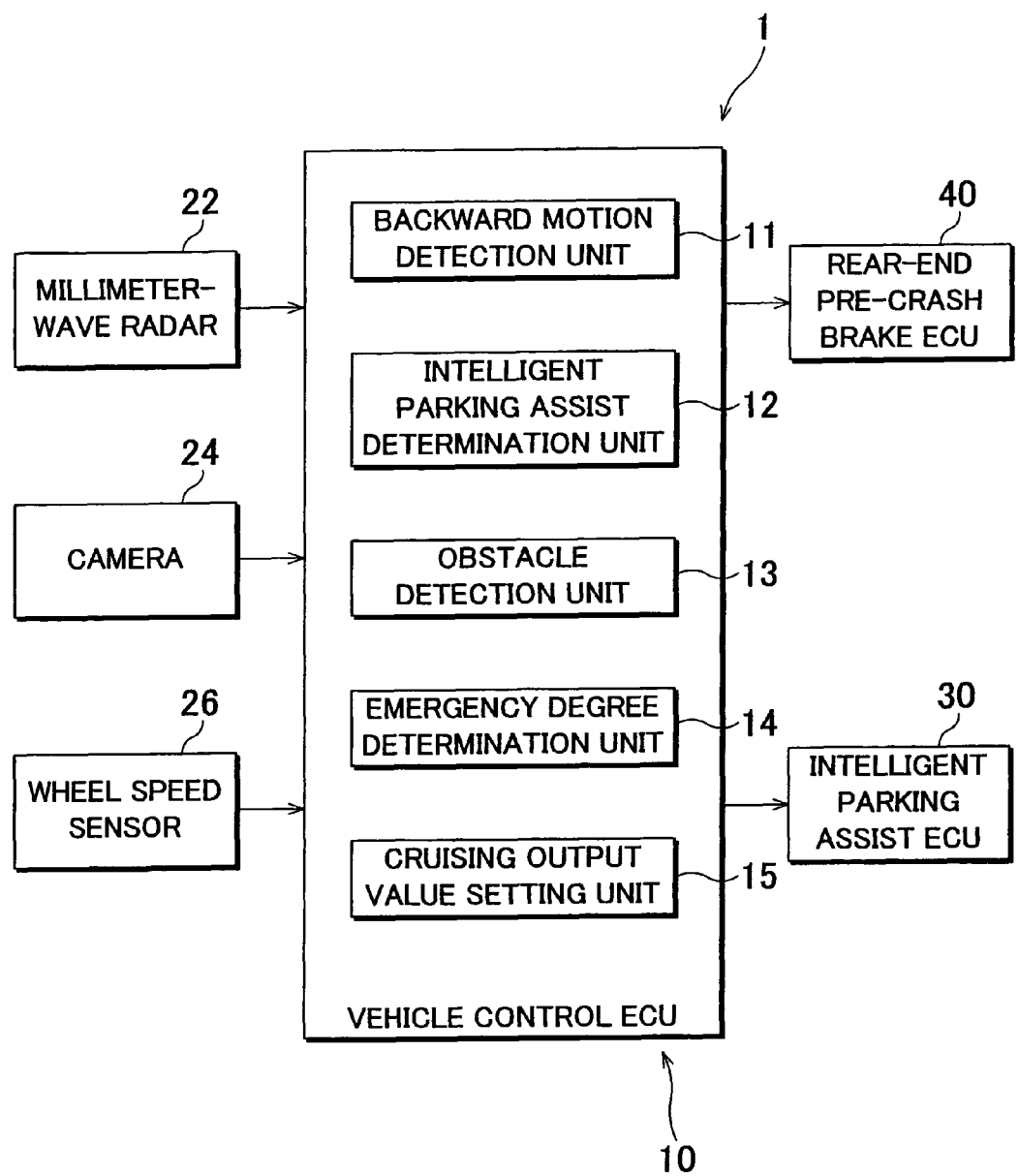
FIG. 1 is a block diagram showing the configuration of a vehicle control apparatus according to an embodiment of the invention.

Hereafter, an embodiment of the invention will be described with reference to the accompanying drawings. The same reference numerals will be assigned to the same components, and the description concerning the components having the same reference numerals will be provided only once below.

FIG. 1 is a block diagram showing the configuration of a vehicle control apparatus 1 according to an embodiment of the invention. The vehicle control apparatus 1 controls a vehicle that is provided with an intelligent parking assist apparatus, which automatically parks the vehicle, and a rear-end pre-crash brake apparatus, which automatically applies a brake to the vehicle when an obstacle is detected behind the vehicle. As shown in FIG. 1, the vehicle control apparatus 1 includes an electronic control unit for controlling the vehicle (hereinafter, referred to as a "vehicle control ECU") 10.

A millimeter-wave radar 22, a camera 24, and a wheel speed sensor 26 are connected to the vehicle control ECU 10, and signals are transmitted from these components 22, 24 and 26 to the vehicle control ECU 10. The millimeter-wave radar 22 is provided at the rear of the vehicle, and detects an obstacle located within a predetermined detectable area behind the vehicle. The camera 24 is a stereo camera which is provided at the rear of the vehicle, and which detects an obstacle located within a predetermined detectable area behind the vehicle. Using both the millimeter-wave radar 22 and the camera 24 as described above enhances the accuracy of detection. The wheel sensor 26 outputs wheel speed pulses and the information on the rotation direction of wheel, which correspond to the wheel rotation.

An intelligent parking assist ECU 30 and a rear-end pre-crash brake ECU 40 are connected to the vehicle control ECU 10, and command signals are transmitted from the vehicle control ECU 10 to these ECUs 30 and 40. The intelligent parking assist ECU 30 forms a part of the intelligent parking assist apparatus. The rear-end pre-crash brake ECU 40 forms a part of the rear-end pre-crash brake apparatus that is one type of pre-crash brake apparatuses. The intelligent parking assist ECU 30 controls a steering ECU (not shown) and an engine ECU (not shown) in order to assist the parking operation by automatically moving the vehicle in response to an instruction from a driver. The rear-end pre-crash brake ECU 40 controls a brake ECU (not shown) to prevent the vehicle from colliding with an obstacle behind the vehicle.

The vehicle control ECU 10 includes a backward motion detection unit 11, an intelligent parking assist determination unit 12, an obstacle detection unit 13, an emergency degree determination unit 14, and a cruising output value setting unit 15.

The backward motion detection unit 11 determines whether the vehicle is backing up based on the information on the direction of wheel rotation, which is provided by the wheel speed sensor 26. The intelligent parking assist determination unit 12 determines whether the intelligent parking assist apparatus is set to operate based on the information provided by the intelligent parking assist ECU 30.

The obstacle detection unit 13 determines whether there is an obstacle within a predetermined detectable area behind the vehicle based on the information from at least one of the millimeter-wave radar 22 and the camera 24. The emergency degree determination unit 14 determines the degree of emergency based on the distance between the vehicle and the detected obstacle (more specifically, the estimated time to collision (TTC) between the vehicle and the detected obstacle). The cruising output value setting unit 15 sets a desired cruising output value for the vehicle, which should be achieved using the intelligent parking assist apparatus, by providing the required drive power value to the intelligent parking assist ECU 30. The cruising output value setting unit 15 may be regarded as cruising output value setting means according to the invention.

Next, a vehicle control method executed by the vehicle control apparatus 1 configured in the above-described manner will be described with reference to the flow chart in FIG. 2. The routine in FIG. 2 is started, for example, when an ignition switch is turned on, and is periodically executed at predetermined time intervals.

Figure 2:
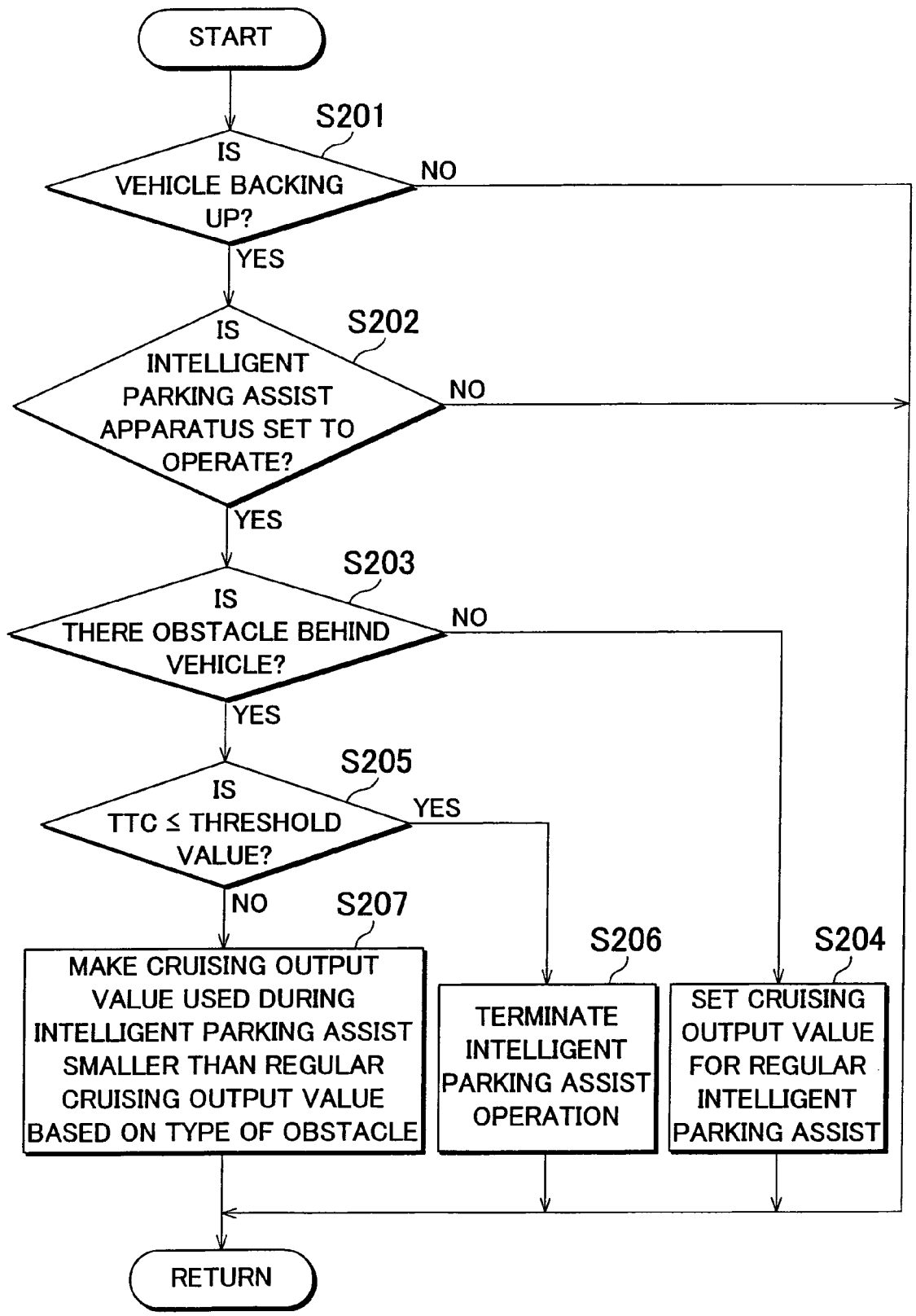
FIG. 2 is a flowchart showing a vehicle control method according to the embodiment of the invention.

As shown in FIG. 2, first, the backward motion detection unit 11 determines whether the vehicle is backing up based on the information on the direction of wheel rotation, which is provided by the wheel speed sensor 26 (step S201). If it is determined that the vehicle is not backing up, the routine ends. If the vehicle is not backing up, neither the intelligent parking assist control nor the rear-end pre-crash brake control is executed. On the other hand, if it is determined that the vehicle is backing up, step S202 is executed.

In step S202, the intelligent parking assist unit 12 determines whether the intelligent parking assist apparatus is set to operate based on the information provided by the intelligent parking assist ECU 30. If it is determined that the intelligent parking assist apparatus is not set to operate, the routine ends. In this case, only the regular rear-end pre-crash brake control is executed by the rear-end pre-crash brake ECU 40. On the other hand, if it is determined that the intelligent parking assist apparatus is set to operate, step S203 is executed.

Figure 3:
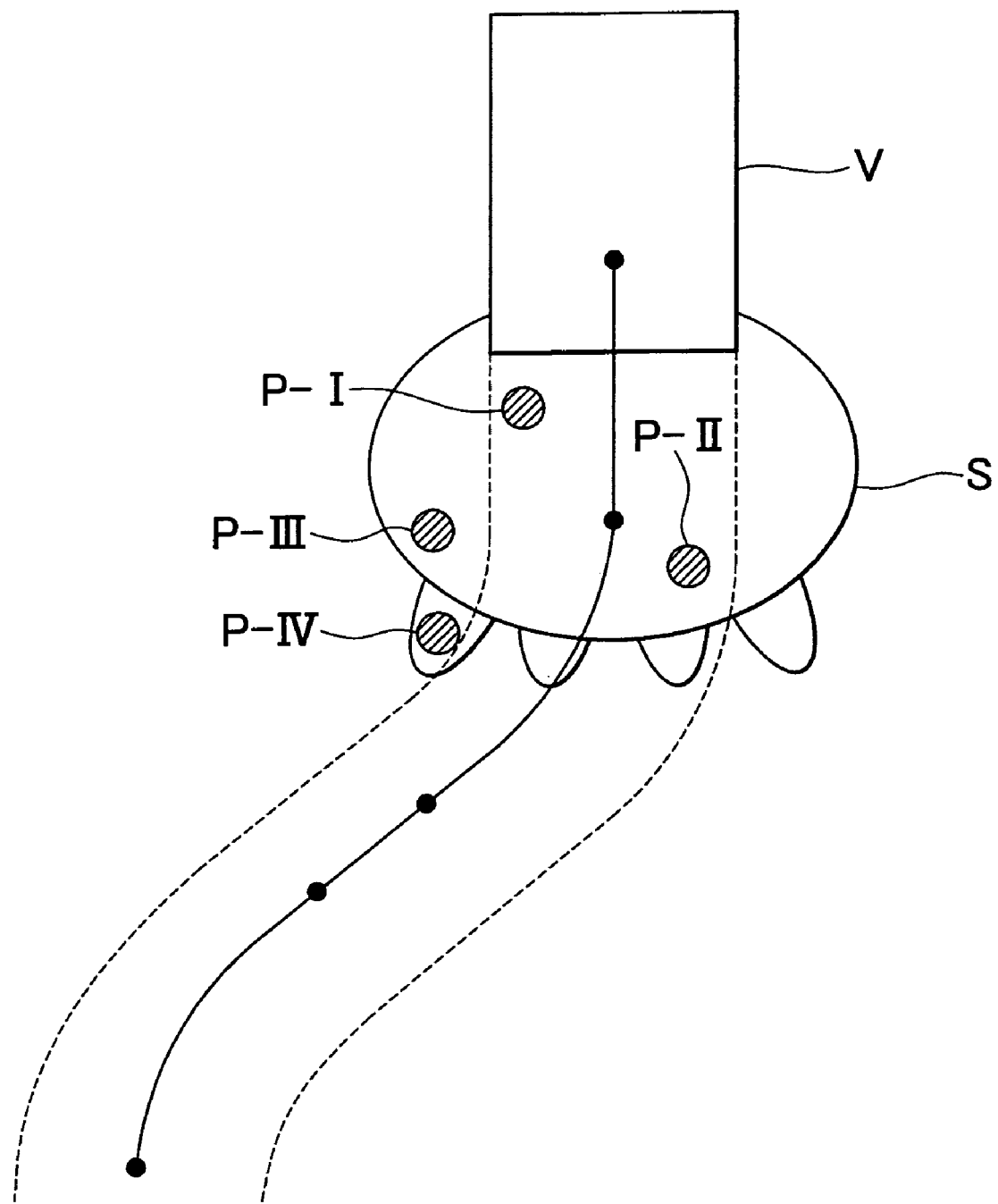
FIG. 3 is a view illustrating the path that will be taken by a vehicle under the intelligent parking assist control, and detection of obstacles behind the vehicle.

In step S203, the obstacle detection unit 13 determines whether there is an obstacle within the predetermined detectable area behind the vehicle based on the information provided by at least one of the millimeter-wave radar 22 and the camera 24. If it is determined that there is no obstacle, step S204 is executed. Because there is no obstacle behind the vehicle, in the step S204, the cruising output value setting unit 15 provides the regular required drive power value to the intelligent parking assist ECU 30 so that the vehicle is automatically parked while moving according to the cruising output value used at normal times. On the other hand, if the obstacle detection unit 13 detects an obstacle, step S205 is executed. FIG. 3 shows four cases in which an obstacle P is detected behind a vehicle V, namely, Case P-I, Case P-II, Case P-III, and Case P-IV. In FIG. 3, the area S enclosed by the solid line is the detectable area. If an obstacle is within the detectable area S, the obstacle is detected by at least one of the millimeter-wave radar 22 and the camera 24. The detectable area S includes four protruding detectable areas which protrude rearward from the main portion of the detectable area S. Obstacles within these protruding detectable areas are detected only by the millimeter-wave radar 22 having directivity.

In step S205, the emergency degree determination unit 14 determines the degree of emergency based on the distance between the detected obstacle P and the vehicle V. More specifically, the emergency degree is determined based on the estimated time to the collision (TTC) between the obstacle P and the vehicle V. If the degree of the emergency is high, for example in the Case P-I, more specifically, if the estimated time to the collision (TTC) is equal to or shorter than a predetermined threshold value, step S206 is executed. Because the degree of emergency is high, in step S206, the cruising output value setting unit 15 provides a value of zero as the required drive power value to the intelligent parking assist ECU 30. In this way, the cruising output value setting unit 15 sets the cruising output value for the vehicle, which should be achieved using the intelligent parking assist apparatus, to zero to terminate the operation of the intelligent parking assist apparatus. Accordingly, it is possible to terminate execution of the intelligent parking assist control, when it is impossible to avoid a collision, when a collision actually occurs, etc. This makes it possible to enhance of the safety of the vehicle. "Making a cruising output value smaller than a regular cruising output value" according to the invention includes setting the cruising output value for the vehicle, which should be achieved using the intelligent parking assist apparatus, to zero by providing the value of zero as the required drive power value to the intelligent parking assist ECU 30 in order to terminate the operation of the intelligent parking assist apparatus. On the other hand, when the emergency degree determination unit 14 determines that the degree of emergency is relatively low, for example, in the Case P-II, case P-III, or Case P-IV, more specifically, when estimated time to the collision (TTC) is longer than the predetermined threshold value, step S207 is executed.

Although the estimated time to collision between the obstacle P and the vehicle V is relatively long, the cruising output value, which should be achieved using the intelligent parking assist apparatus, is made smaller than the regular cruising output value in order to avoid a collision. At this time, the manner in which the cruising output value is reduced is changed based on the type of the obstacle P.

More specifically, if the shape of the detected obstacle P is formed of a plane, straight lines, etc, it is estimated that the obstacle is an immovable object, for example, a wall or a warehouse. In this case, the amount by which the cruising output value is made smaller than the regular cruising output value is set to the minimum amount. For example, if the regular cruising output value is 10 km/h, the cruising output value is set to 8 km/h in this case. If the obstacle P is not on the estimated path along which the vehicle V will back up, for example, in the Case P-III, the regular cruising output value may be continuously used instead of making the cruising output value smaller than the regular cruising output value. If it is not clear whether the obstacle P is on the estimated path along which the vehicle V will back up, for example, in the Case P-IV, the amount by which the cruising output value is made smaller than the regular cruising output value is set to the minimum amount. If the shape of the detected obstacle P is formed of, for example, curved lines, there is possibility that the obstacle P will move. Therefore, the amount by which the cruising output value is made smaller than the regular cruising output value is set to the regular amount. For example, when the cruising output value is set to 8 km/h as a result of being made smaller than the regular cruising output value by the minimum amount, the cruising output value is set to 6 km/h in this case. If the shape of the detected obstacle P is a human shape, for example, the proportion of the head to the height is approximately five to eight, it is determined that there is a high possibly that the obstacle P will move and the degree of emergency is high. Accordingly, the cruising output value is made smaller than the regular cruising output value by the maximum amount. For example, when the cruising output value is set to 6 km/h as a result of being made smaller than the regular cruising output value by the regular amount, the cruising output value is set to 4 km/h in this case. Instead of making the cruising output value smaller than the regular cruising output value by the maximum amount, the cruising output value for the vehicle, which should be achieved using the intelligent parking assist apparatus, may be set to zero by providing the value of zero as the required drive power value to the intelligent parking assist ECU 30 in order to terminate the operation of the intelligent parking assist apparatus.

As described above, the vehicle control apparatus 1 according to the embodiment of the invention, when an obstacle is detected, the cruising output value, which should be achieved using the intelligent parking assist apparatus, is made smaller than the regular cruising output value by the intelligent parking assist ECU 30. Accordingly, a brake is more easily applied to the vehicle by the rear-end pre-crash brake apparatus using the rear-end pre-crash brake ECU 40. According to the embodiment of the invention, it is possible to maintain the safety of the vehicle without reducing the usability, and to secure appropriate coordination between the intelligent parking assist apparatus and the rear-end pre-crash brake control apparatus. As a result, the intelligent parking assist operation is more appropriately performed.

In addition, the cruising output value setting unit 15 sets the cruising output value to zero when the distance between the vehicle V and the obstacle P, in other words, the estimated time to the collision (TTC) is shorter than the predetermined value. Thus, it is possible to avoid a collision between the vehicle and the obstacle and to enhance the safety of the vehicle.

Further more, the cruising output value setting unit 15 changes the manner in which the cruising output value, which should be achieved using the intelligent parking assist apparatus, is made smaller than the regular cruising output value, based on the type of the obstacle. Accordingly, the intelligent parking assist operation is more appropriately performed with the usability and the safety of the vehicle taken into account.

While the invention has been described with reference to an example embodiment thereof, it is to be understood that the invention is not limited to the example embodiment. To the contrary, the invention is intended to cover various modifications and equivalent arrangements within the scope of the invention.

Figure 4:
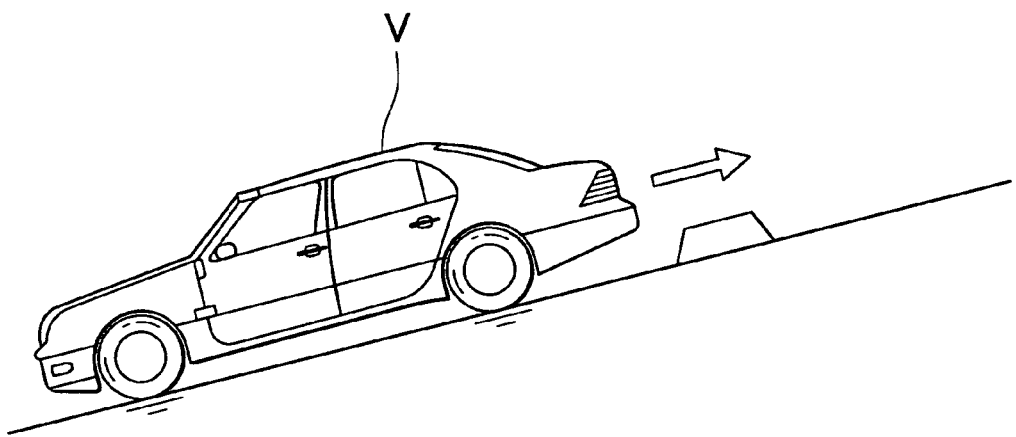
FIG. 4 is a view illustrating the creep-up control.

For example, the intelligent parking assist apparatus may include drive power increase means for temporarily increasing the drive power when the vehicle does not move for a predetermined time, although a specific cruising output value is provided. In this case, the intelligent parking assist ECU 30 may include a drive power increase unit (the drive power increase means) that temporarily increases the drive power. When an obstacle is detected, the cruising output value setting unit 15 may prohibit an increase in the drive power made by the drive power increase means. As shown FIG. 4, when the vehicle V needs to back up on a slightly inclined uphill slope or a road with a slight bump, if the vehicle V does not move for a predetermined time although a cruising output value set based on a required drive power value is provided, the creep-up control for temporarily increasing the drive power using the drive power increase means may be executed. Even in this case, a temporary increase in the drive power made by the driving force increase means is prohibited if an obstacle is detected. Thus, it is possible to enhance the safety of the vehicle and to control the vehicle more appropriately.

In the embodiment of the invention described above, appropriate coordination is ensured between the intelligent parking assist apparatus, which serves as the automatic cruise apparatus, and the rear-end pre-crash brake apparatus. However, the automatic cruise apparatus is not limited to the intelligent parking assist apparatus, and the pre-crash brake apparatus is not limited to the rear-end pre-crash brake apparatus. In other words, the vehicle control apparatus according to the invention is applied not only to the rear-side assist control (intelligent parking assist control) but also to various controls.

In the embodiment of the invention described above, the vehicle control ECU 10, the rear-end pre-crash brake ECU 40, and the intelligent parking assist ECU 30 are formed of separate pieces of hardware. However, these ECUs may be integrated into one or two pieces of hardware.

While the invention has been described with reference to an example embodiment thereof, it should be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

The invention claimed is:

1. A vehicle control apparatus, comprising:
   an automatic cruise apparatus that automatically moves a vehicle;
   a pre-crash brake apparatus that automatically applies a brake to the vehicle when an obstacle is detected; and
   a cruising output value setting unit that outputs a cruising output value, when the obstacle is detected, that is smaller than a regular cruising output value that is output when the obstacle is not detected.

2. A vehicle control method, comprising:
   controlling an automatic vehicle cruise;
   determining whether there is an obstacle within a predetermined area near a vehicle; and
   outputting a cruising output value, when the obstacle is detected, that is smaller than a regular cruising output value that is output when the obstacle is not detected.

3. The vehicle control method according to claim 2, wherein:
   the cruising output value is set to zero when a distance between the vehicle and the obstacle or an estimated time to collision between the vehicle and the obstacle is equal to or shorter than a threshold value; and
   a manner, in which the cruising output value is made smaller than the regular cruising output value, is changed based on a type of the obstacle, when the distance between the vehicle and the obstacle or the estimated time to collision between the vehicle and the obstacle is longer than the threshold value.

4. The vehicle control method according to claim 2, wherein the automatic vehicle cruise is an intelligent vehicle parking assist.

5. The vehicle control apparatus according to claim 1, wherein the automatic cruise apparatus is an intelligent parking assist apparatus that automatically parks the vehicle.

6. The vehicle control apparatus according to claim 5, wherein only the pre-crash brake apparatus is operated when the intelligent parking assist apparatus is not operated.

7. The vehicle control apparatus according to claim 1, wherein the cruising output value setting unit sets the cruising output value to zero, when a distance between the vehicle and the obstacle is equal to or shorter than a threshold value.

8. The vehicle control apparatus according to claim 1, wherein the cruising output value setting unit sets the cruising output value to zero, when an estimated time to collision between the vehicle and the obstacle is equal to or shorter than a threshold value.

9. The vehicle control apparatus according to claim 1, wherein the cruising output value setting unit changes a manner, in which the cruising output value is made smaller than the regular cruising output value, based on a type of the detected obstacle.

10. The vehicle control apparatus according to claim 9, wherein the cruising output value setting unit makes the cruising output value smaller than the regular cruising output value by a larger amount when an obstacle that may move is detected than when an immovable obstacle is detected, and increases the amount by which the cruising output value is made smaller than the regular cruising output value as a possibility of collision between the vehicle and the obstacle that may move is higher.

11. The vehicle control apparatus according to claim 1, wherein:
    the automatic cruise apparatus further comprises a drive power increase unit for temporarily increasing drive power when the vehicle does not move for a predetermined time although a predetermined cruising output value is provided; and
    the cruising output value setting unit prohibits an increase in the drive power made by the drive power increase unit, when the obstacle is detected.

* * * * *